Oct. 8, 1946.  J. J. OSPLACK  2,408,995
SPINDLE BEARING
Original Filed Nov. 15, 1943
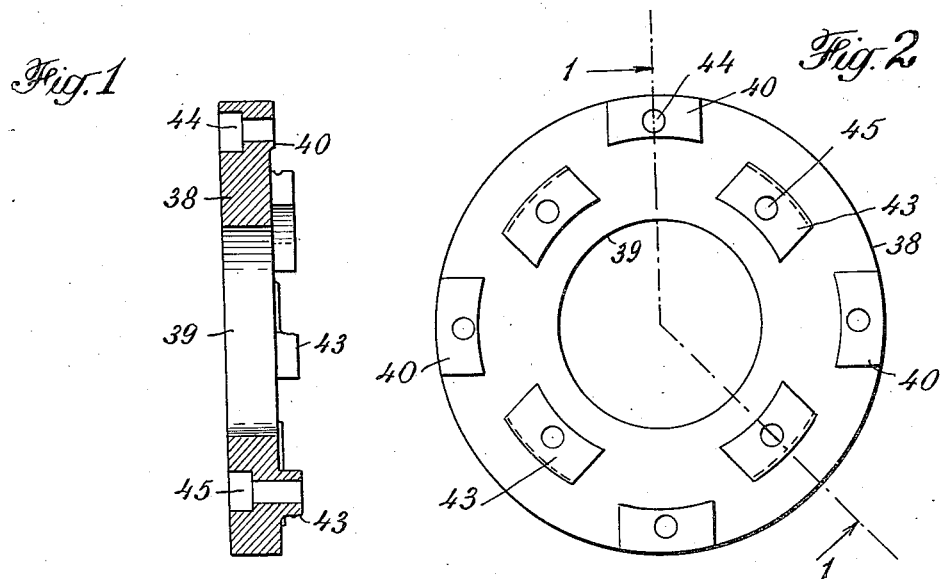
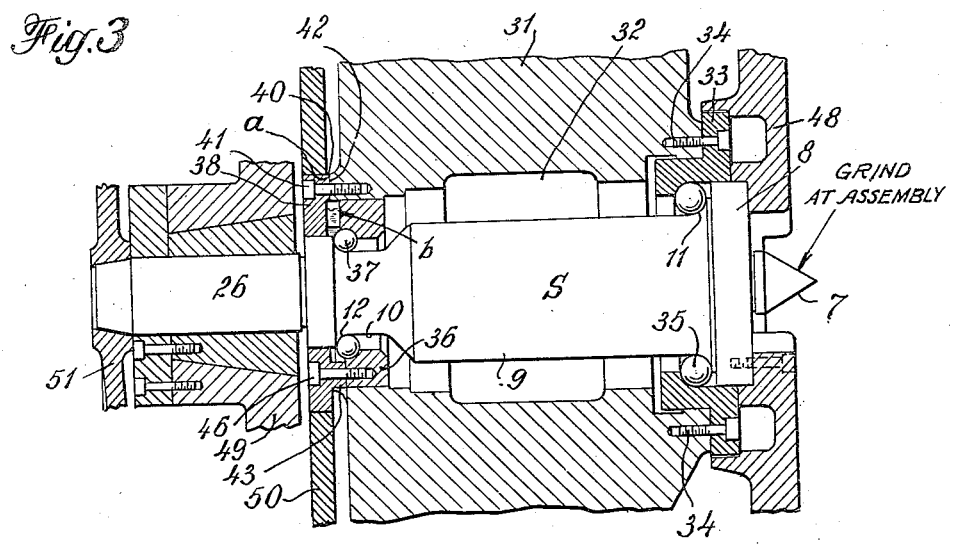
INVENTOR
Joseph J. Osplack
BY
Pennie, Davis, Marvin & Edmonds
HIS ATTORNEYS Patented Oct. 8, 1946

2,408,995

UNITED STATES PATENT OFFICE 2,408,995

SPINDLE BEARING

Joseph J. Osplack, Detroit, Mich., assignor to Vinco Corporation, Detroit, Mich., a corporation of Michigan Original application November 15, 1943, Serial No. 510,321. Divided and this application April 17, 1945, Serial No. 588,814

3 Claims. (Cl. 308—189)

This invention relates to spindles for use in high precision instruments and more particularly concerns an improved true running spindle and bearing assembly.

In the manufacture of high precision machine parts and tools, it is necessary that the finished elements be inspected to determine whether their dimensions are within permitted tolerances. Many circular section parts such as gears, splines and the like are inspected by mounting the part on a rotary spindle or between a pair of rotary spindles and measuring the gear or spline teeth or other elements as the part is turned to successive positions around the spindle axis. Optical apparatus has been devised capable of making measurements to an accuracy of the order of one-millionth of an inch and such measuring apparatus is particularly well adapted for operations of the type described. When previously known spindles are employed to support the parts measured by such apparatus, the departure of the spindle from true circular movement introduces inaccuracies that are substantial as compared with the degree of precision attainable by the optical system.

Spindles for the described purpose are mounted in anti-friction ball bearings to insure smooth operation without substantial wear or bearing play. Ball bearings are preferable, but I have found that ball bearings made by conventional procedure do not run precisely true.

It is the object of the present invention to provide an improved ball bearing mounted spindle for precision instruments which turns freely with a minimum bearing clearance and which runs so true about its axis that extremely accurate measurements can be made on parts supported by and rotated on the spindle. Another object of the invention is to provide a spindle and bearing assembly of the type described which may be readily assembled and adjusted to eliminate both binding and excess clearance. This application is a division of my co-pending application Serial No. 510,321, filed November 15, 1943, entitled Spindle bearings and method of making the same.

The invention will be described in connection with a specific embodiment thereof which is illustrated in the accompanying drawing. In the drawing:

Fig. 1 is a sectional view of an outer ball race mounting ring employed in assembling the disclosed embodiment of my improved spindle, the section being taken along the line 1—1 of Fig. 2;

Fig. 2 is an inner end elevation of the mounting ring shown in Fig. 1; and

Fig. 3 is a sectional veiw of the finished spindle and bearing assembly mounted in the frame of a precision instrument, the section being taken along planes indicated by the line 1—1 in Fig. 2.

The spindle S of the disclosed embodiment comprises an elongated cylindrical section element formed of steel. As shown, the spindle S has a center point 7 at one end, an adjacent head 8, a central portion including a large barrel 9 and a reduced bearing section 10 and an end shaft 26. In accordance with the invention, two inner ball races 11 and 12 of circular section are formed directly on the spindle at spaced points. The race 11 shown is close to the head 8 at the center point end of the spindle, and the race 12 is formed at one end of the reduced section 10. I have devised an improved method of fabricating the spindle which produces truly round ball races 11 and 12 accurately centered with respect to an axis passing through the center point 7. This method is described and claimed in my above noted co-pending application Serial No. 510,321, filed November 15, 1943.

The spindle S is shown assembled in the supporting structure of the precision instrument or other device in which it is to operate. As shown in Fig. 3, this structure may comprise a massive frame member 31 having an opening therethrough in which the spindle S is mounted. An accurately formed outer ball race 33 which may be made by standard procedure is secured within one end of the opening 32 by machine screws 34 as shown. The spindle S is inserted, shaft end first, through the outer race 33, bearing balls 35 are placed between the barrel 9 and this race and the spindle is moved to the left to the position shown in Fig. 3 with the balls 35 engaged between the inner race 11 and the outer race 33. The outer ball race 36 for the shaft end of the spindle is also accurately formed by standard procedures. This race 36 is inserted around the reduced portion 10 of the spindle and bearing balls 37 are inserted between the races 36 and 12. The outer shaft end race 36 is then adjusted to the proper position relative to the other outer race 33 by improved means now to be described.

A substantially circular plate 38 having a central opening 39 is provided with a plurality of circumferentially aligned and spaced pads or raised portions 40 on its inner face adjacent its periphery, as best shown in Figs. 1 and 2. These pads 40 have plane faces adapted to engage a finished surface 42 surrounding the opening 32 in the frame 31. A set of inner circumferentially spaced pads 43 is provided on the inner face of the plate 38, these pads being aligned along a circular path of smaller radius than that on which the pads 40 are disposed. As shown in Fig. 2, the pads 40 and 43 are arranged in diametrically aligned pairs with the pads 43 disposed in the angular intervals between the pads 40. This permits the pads 40 and 43 to be independently dressed or ground down by suitable means such as a surface grinder which can be arranged to simultaneously grind opposite pairs of the pads of either set 40 or 43. Screw holes 44 extend through the plate 38 in the pads 40 and similar holes 45 extend therethrough in the pads 43.

The plate 38 is secured to the frame 31 by the screws 41 with the pads 40 engaging the surface 42 at the point marked $a$ in Fig. 3. The shaft end outer ball race 36 is secured to the plate 38 by the screws 46 with the outer face of the race abutting the faces of the pads 43 at the point designated $b$ in Fig. 3. Since the distance between the inner ball races 11 and 12 is fixed, it is essential that the outer ball race 36 be precisely spaced with respect to the race 33 in order that both bearings may have the proper clearance. This is accomplished by grinding down one or the other of the sets of pads 40 or 43 on the plate 38. After the plate 38 has been initially assembled as described, the bearings usually have excessive axial clearance since grinding stock has been left on the end faces of the pads 40 and 43. The amount of this clearance is measured by a dial indicator or other suitable means, the plate 38 is removed and the measured amount is ground off the inner pads 43. The plate is again assembled and the bearing clearance again checked. If the clearance is still excessive, the faces of the pads 43 are ground down further, whereas if too little clearance remains, so that the bearings bind, the end faces of the outer pads 41 are ground until the correct clearance is obtained. Thus by grinding the pads 43, the ball race 36 may be moved to the left to reduce bearing clearance, and by grinding the pads 41 the race may be moved to the right to increase the clearance, and a close clearance adjustment is thereby attained.

After final assembly of the spindle S, the center point 7 is ground true by rotating the spindle in its bearings and applying a suitably mounted rotating grinding wheel to the center point. This operation insures that the center runs true with respect to the axis of rotation of the spindle in its bearings.

My improved ball bearing mounted spindle may be used in various instruments and devices where a precisely true running rotary support is required. In one such application, it serves as the work supporting spindle of an optical dividing head, and for this purpose a face plate 48 may be suitably secured to the spindle head 8 and an index wheel 49 may be secured to the spindle shaft 26 to cooperate with an index plate 50 fixed to the frame 31. Suitably operating means 51 may be fixed to the shaft 26 to turn the spindle.

In the foregoing specification and the appended claims, the term "finishing" is used generically to cover any and all of the operations necessary to produce a surface of the required accurate contours and dimensions, such operations including grinding, lapping, polishing and the like.

I claim:

1. In a device of the character described, in combination, an elongated spindle, a pair of spaced ball bearings on said spindle including oppositely disposed outer ball races, a support, means for fixing one of said outer races to said support and means for adjusting the other of said outer ball races relative to said fixed outer ball race comprising a plate, a set of protruding pads on said plate for engagement with said adjustable outer ball race and a second set of pads on said plate protruding therefrom in the same direction as said first set and spaced from the pads of said first set for engagement with said support.

2. In a device of the character described, in combination, an elongated spindle, a pair of spaced ball bearings on said spindle including inner ball races integral with said spindle and oppositely disposed outer ball races, a support, means for fixing one of said outer ball races to said support and means for adjusting the other of said outer ball races relative to said fixed outer race comprising a plate, a set of spaced pads protruding from said plate and disposed along a circular path thereon for engagement with an end face of said adjustable outer race, and a second set of spaced pads protruding from said plate in the same direction as said first set and disposed substantially along a circular path surrounding said first set for engagement with said support.

3. In a device of the character described, in combination with a support, an elongated spindle having two spaced ball bearings each including inner ball races formed integral with the spindle and oppositely disposed outer ball races and means for fixing one of the outer ball races to said support, an adjustable support for the other of said outer races comprising a plate disposed transversely across the axis of said spindle, two sets of spaced pads protruding from one face of said plate, the pads of one of said sets being spaced radially and circumferentially of the spindle axis with respect to the pads of the other set, means for securing said other outer race to said plate in engagement with the ends of the pads of one of said sets and means for securing said plate to said support with the ends of the pads of the other of said sets in contact with said support.

JOSEPH J. OSPLACK.